United States Patent [19]

Humphrey

[11] 4,070,115
[45] * Jan. 24, 1978

[54] LENS METER

[75] Inventor: William Edwin Humphrey, Orinda, Calif.

[73] Assignee: Humphrey Instruments, Inc., San Leandro, Calif.

[*] Notice: The portion of the term of this patent subsequent to Mar. 30, 1993, has been disclaimed.

[21] Appl. No.: 670,773

[22] Filed: Mar. 26, 1976

[51] Int. Cl.² .............................................. G01D 9/00
[52] U.S. Cl. ..................................... 356/125; 356/127
[58] Field of Search ...................... 356/124, 125, 127; 351/17, 29

[56] References Cited

U.S. PATENT DOCUMENTS

| | | | |
|---|---|---|---|
| 3,822,932 | 7/1974 | Humphrey | 351/17 |
| 3,832,066 | 8/1974 | Cornsweet | 356/124 |
| 3,841,760 | 10/1974 | Guyton | 356/124 |
| 3,947,097 | 3/1976 | Humphrey | 351/17 |

Primary Examiner—Conrad J. Clark
Attorney, Agent, or Firm—Townsend and Townsend

[57] ABSTRACT

A lens meter is disclosed in which continuously variable spherical and astigmatic corrective optics are manipulated to measure the prescription of a suspect optical system. A target including a straight line is focused for maximum clarity, the target being arbitrarily aligned without respect to the axis of the suspect optical system. Continuously variable spherical and first astigmatic optics are juxtaposed to the suspect optics and the image of the target projected through both the suspect optics and the continuously variable optics. Spherical and first astigmatic corrections along at least one axis diagonal to the line target is made until maximum sharpness of a projected image of the line results. A first component of astigmatic correction results. A second target, again consisting of a straight line, is introduced; this target is angularly inclined with respect to the first target preferably at 45°. Spherical adjustment is made together with a diagonally aligned second astigmatic correction along at least one axis diagonal to the second line target until maximum sharpness of the projected image of the line results. A second component of astigmatic correction and final spherical correction results. Provision is made for remote manipulation of the continuously variable optics to determine prescription automatically.

36 Claims, 17 Drawing Figures

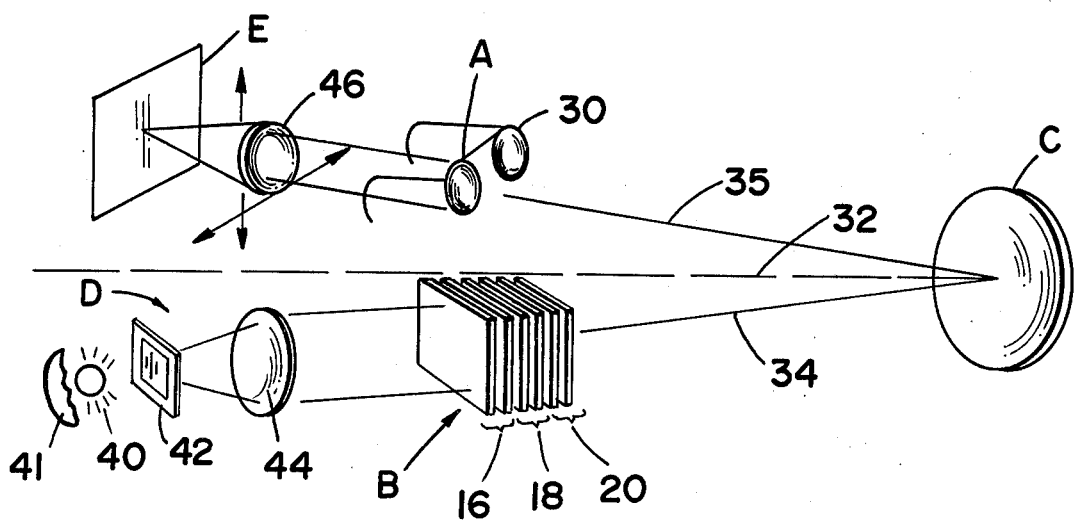
FIG_1
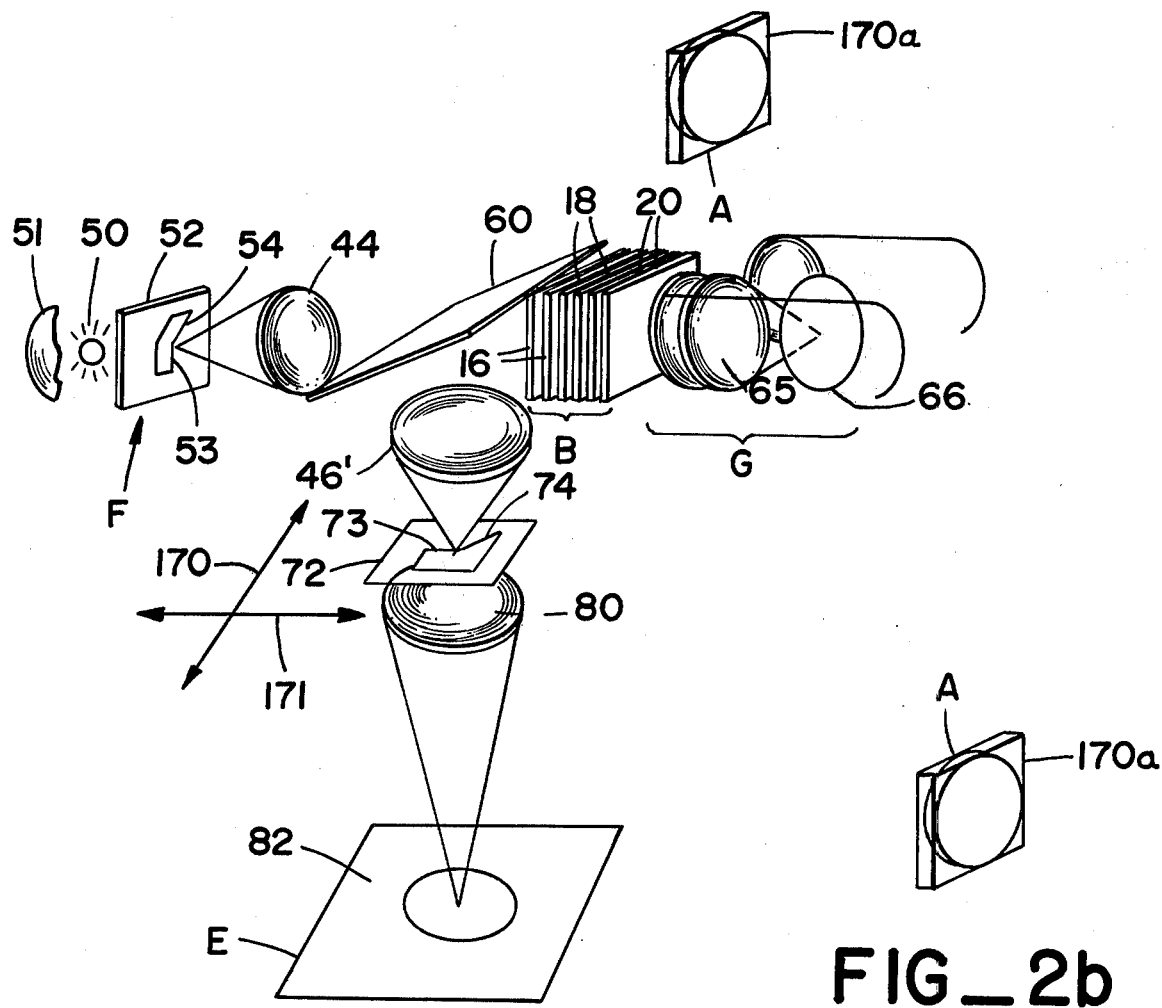
FIG_2a
FIG_2b

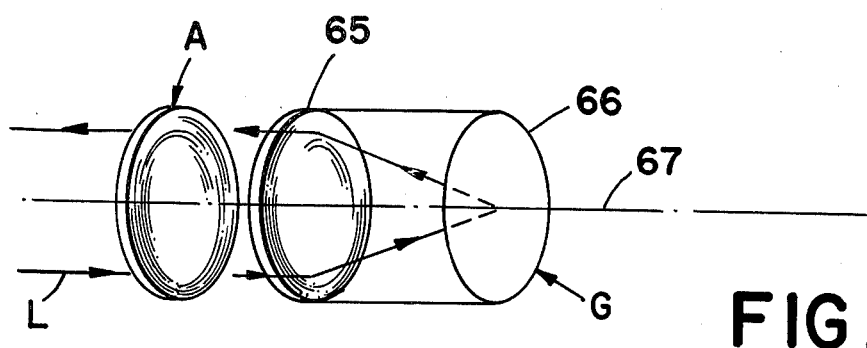
FIG_2c
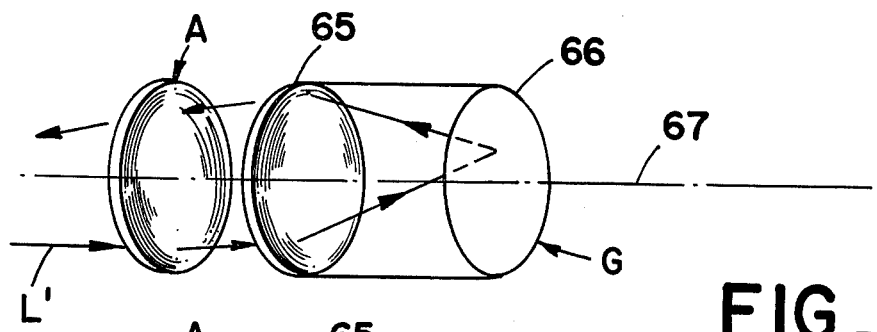
FIG_2d
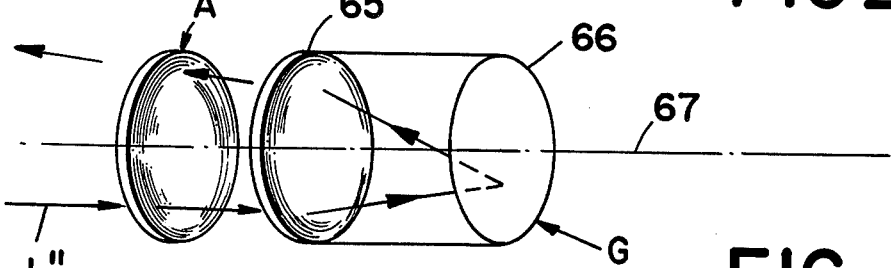
FIG_2e
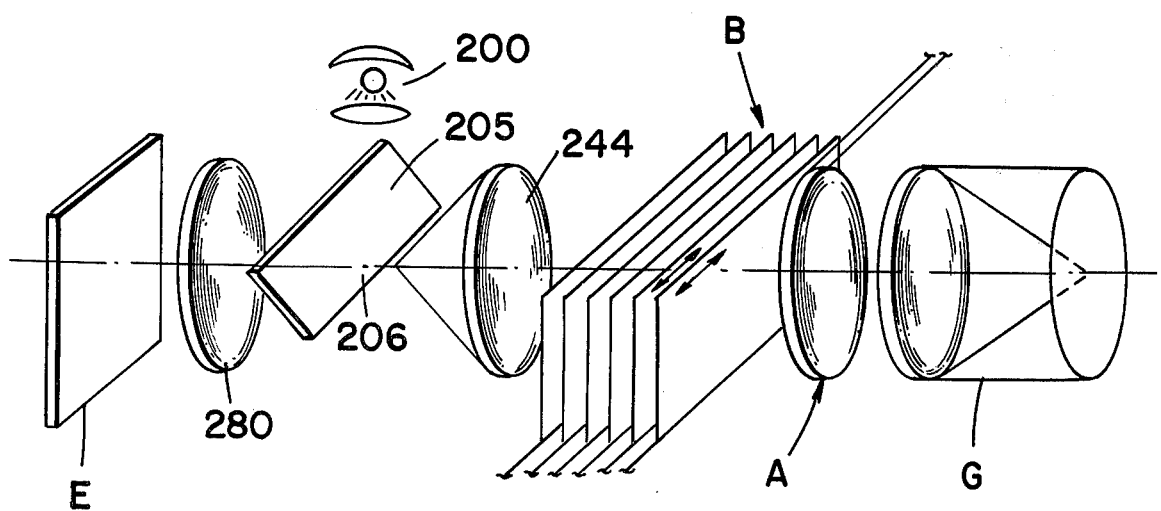
FIG_6

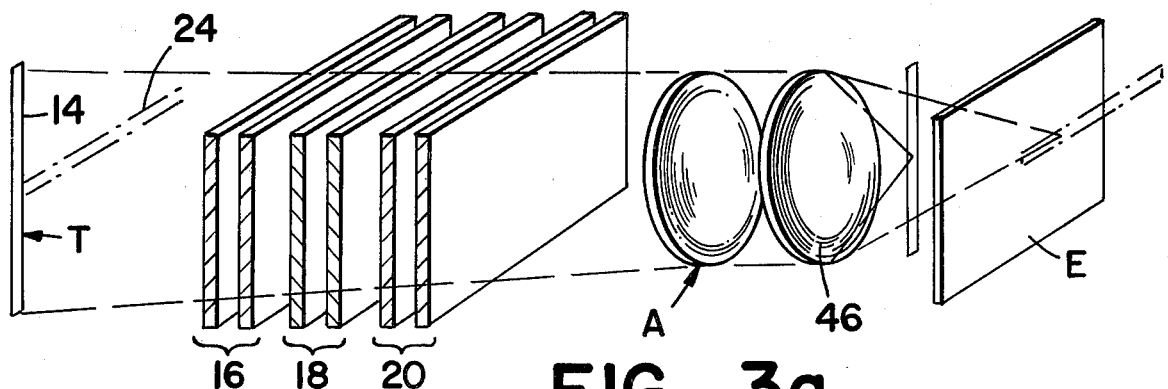
FIG_3a
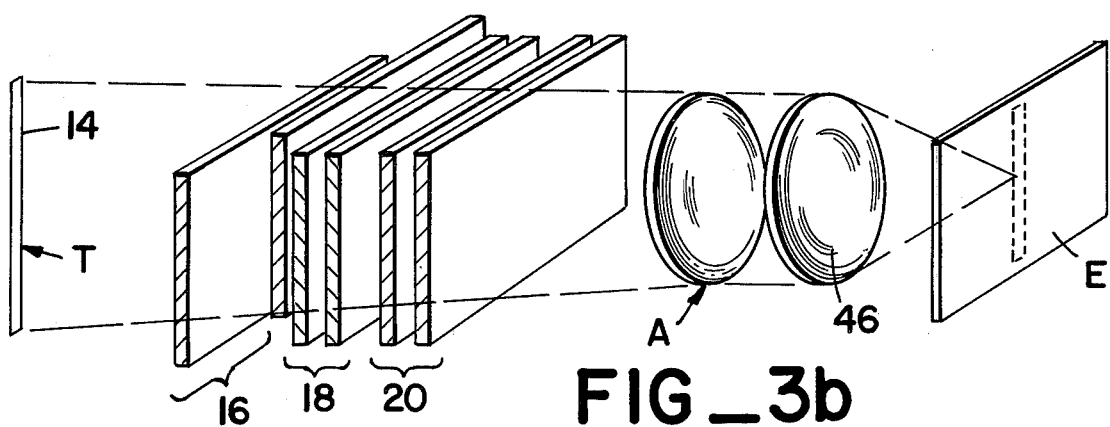
FIG_3b
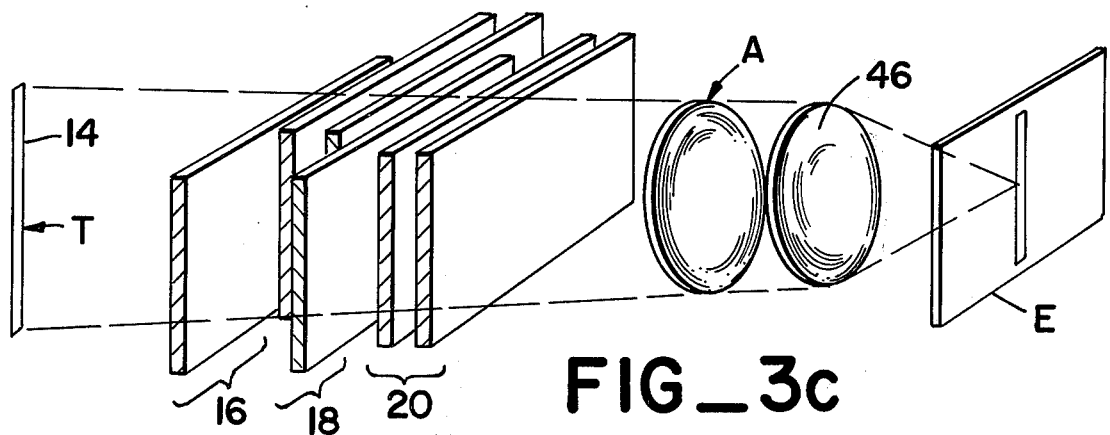
FIG_3c
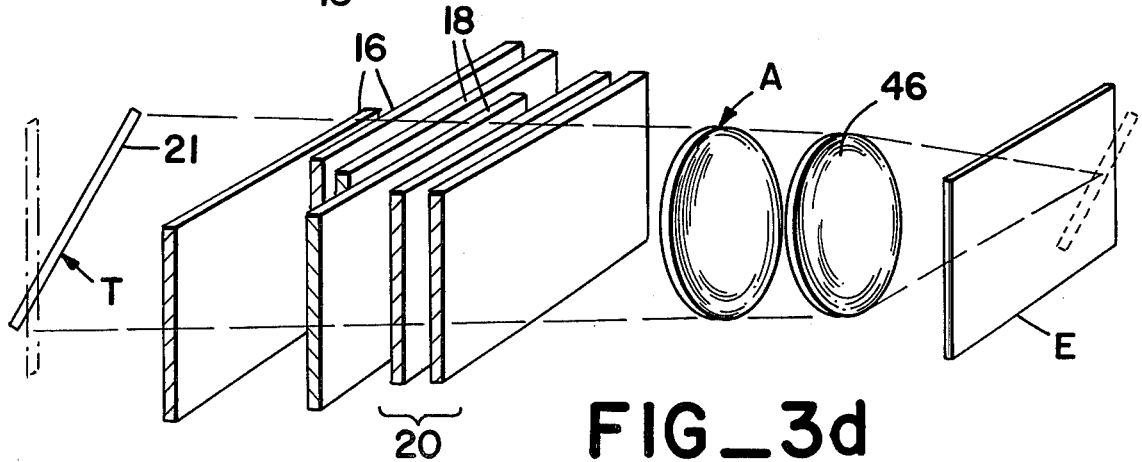
FIG_3d

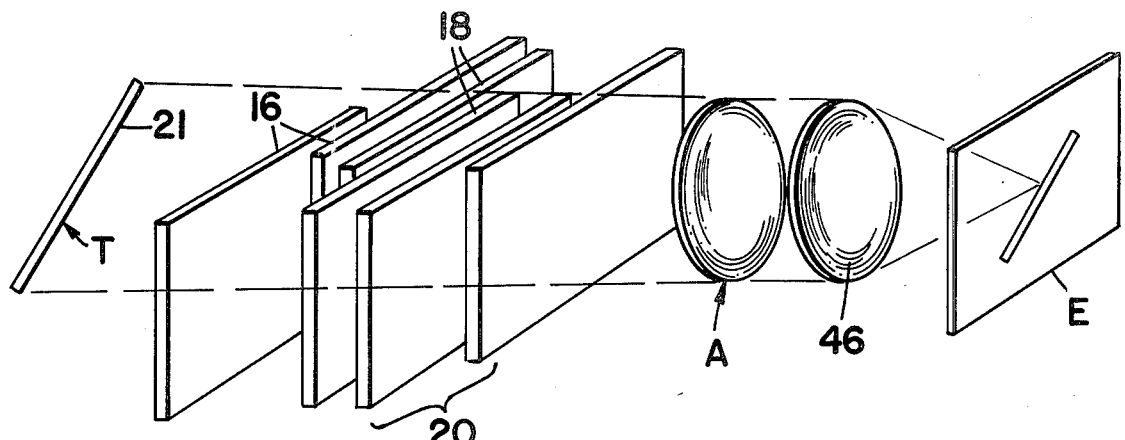
FIG_3e
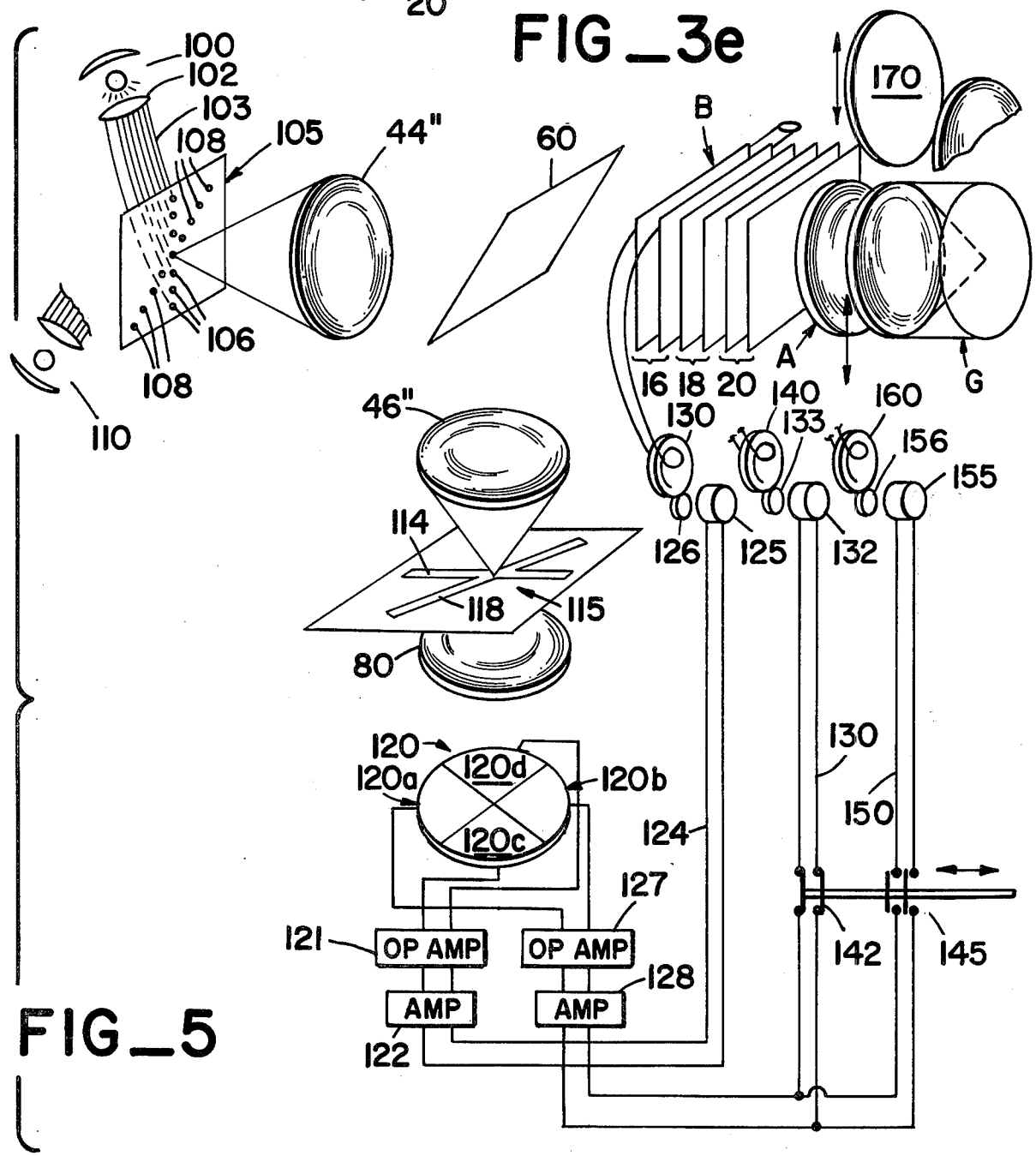
FIG_5

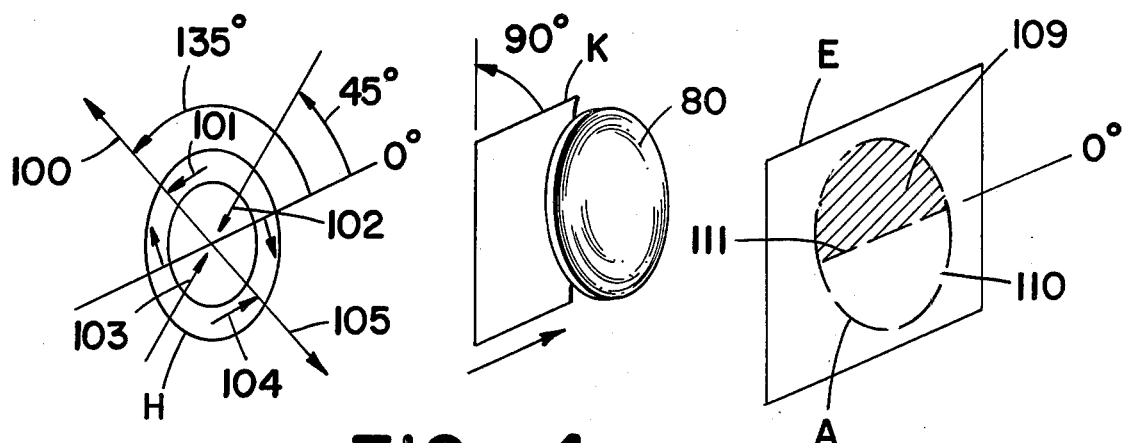
FIG_4a
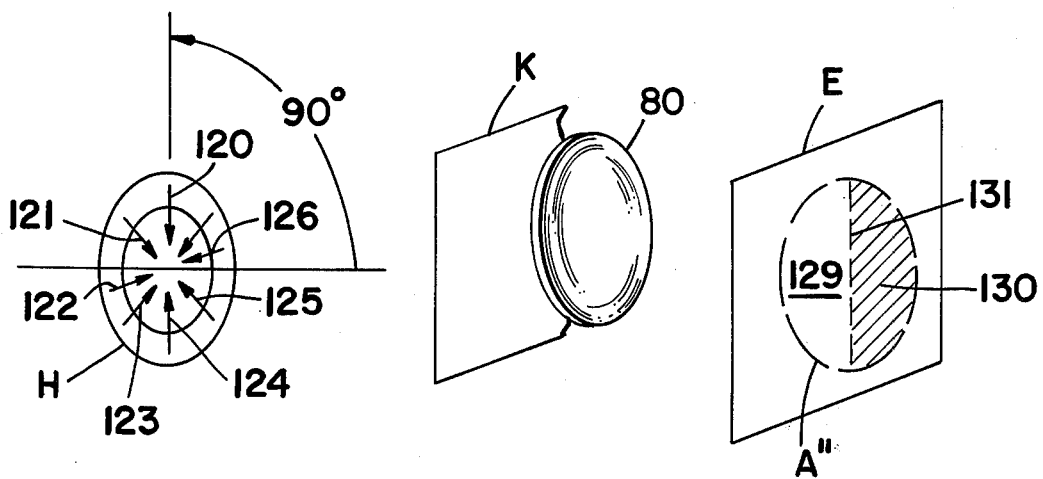
FIG_4b
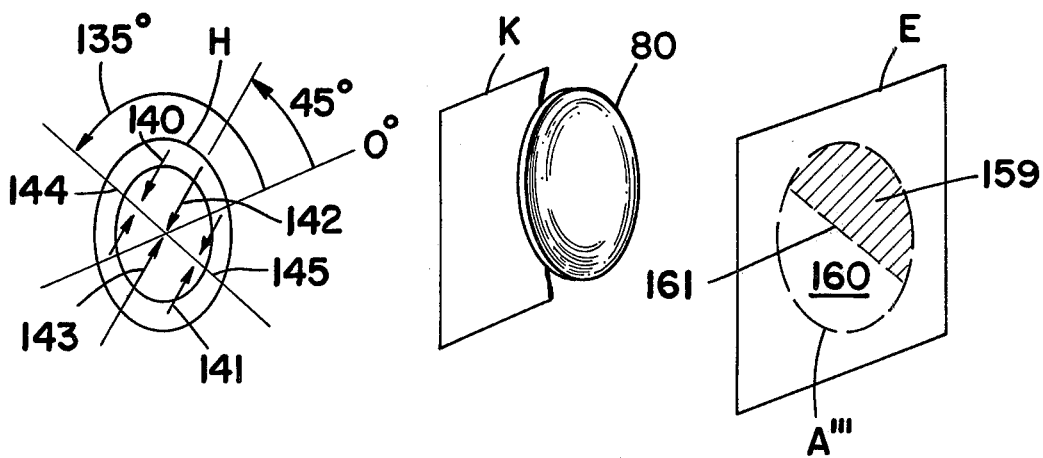
FIG_4c

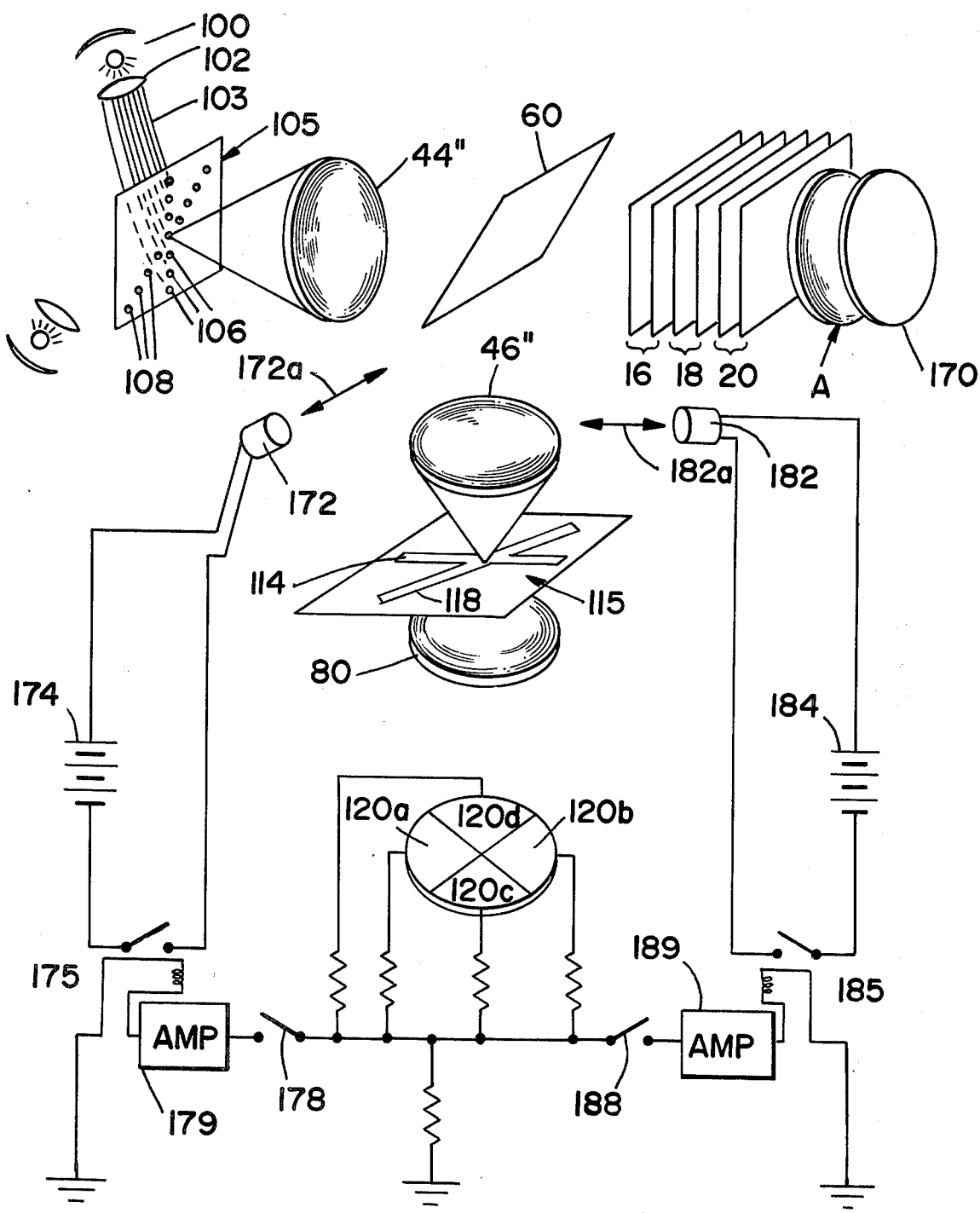
FIG _ 7

LENS METER

This invention relates to lens meter and more particularly to a lens meter using continuously variable spherical and astigmatic corrective optics having the capability of remote and automated determination of the corrective power of a suspect optical system.

SUMMARY OF THE PRIOR ART

Conventional lens meters commonly employ what is known as a target mire. Typically, the suspect optical system is placed into the lens meter preferably at the major reference point of the suspect optical system. The imaging of a target mire occurs through a very small area of the suspect optical system, again preferably at the major reference point. In measurement, the target mire is manually rotated to be aligned with either a maximum or a minimum of meridional power in the suspect optical system. Thus, it can be seen that rotational alignment of the lens meter to a suspect astigmatic axis of the suspect optical system occurs. Once the target mire is aligned and lines within the image focused to a maximum clarity (say, for example, to the maximum of meridional power), a first recordation of correction is made. Thereafter, a standard lens is moved to produce a minimum on a second and different set of lines in the target mire image. A second recordation is made. By the expedient of noting one reading as sphere, noting the difference between the readings as cylinder, and noting the alignment of the target mire at maximum or minimum as axis, a conventional measurement of the power of a suspect system in power of sphere, power of cylinder, and alignment of cylinder can be made.

This conventional prior art system is not without its disadvantages. First, it requires rotation of an element in the lens meter into coincidence with a principal axis of a suspect optical system. Secondly, such lens meters are not conveniently adapted to provisions for automation; a device which automatically determines the prescription provided in a pair of glasses cannot be easily designed around their operation. Third, when the target mire image is rotated to focus at maximum, portions of the minimum of the target mire image are obscured. Conversely, when the minimum is in focus, the portion of the maximum of the target mire image is obscured. Additionally, such conventional lens meters only look through a small segment of a lens. Uniformity of the entire lens is commonly not analyzed without numerous repetitions of the original process.

It should be additionally noted that such prior art lens meters can be in error by a factor which is directly proportional to any error in the eye of an operator utilizing the lens meter. It has been discovered that astigmatic errors can vectorially add. Thus, where an examiner with an astigmatic error looks through a conventional lens meter, his reading of the suspect optics can be off by a factor related to the eye examiner's personal astigmatism. While such an error will decrease with the increasing power of a telescope commonly affixed to and associated with such lens meters, it should be understood that such an error can and often is introduced into the analysis of a suspect optical system by a conventional lens meter.

SUMMARY OF THE INVENTION

A lens meter is disclosed in which continuously variable spherical and astigmatic corrective optics are manipulated to measure the prescription of a suspect optical system. A target, for example a straight line, is focused for maximum clarity, the target being arbitrarily aligned without respect to the axis of the suspect optical system. Continuously variable spherical and first astigmatic optics are juxtaposed to the suspect optics and the image of the target projected through both the suspect optics and the continuously variable optics. Spherical and first astigmatic corrections along at least one axis diagonal to the line target is made until maximum sharpness of the line results. A first component of astigmatic correction results. A second target, again consisting of a straight line, is introduced; this target is angularly inclined with respect to the first target preferably at 45°. Spherical adjustment is made together with a diagonally aligned second astigmatic correction along at least one axis diagonal to the second line target until maximum sharpness of the line results. A second component of astigmatic correction and final spherical correction results. This second manipulation results in an equal and opposite effect in the continuously variable optics to the suspect optics, all obtained without rotation of any element with respect to the suspect optics.

By the expedient of vector analysis of the two astigmatic components, astigmatic correction can be obtained. Notation can be made in a recently developed form for astigmatic correction or alternately by conversion to either of the more conventional polar descriptions of astigmatism using power of sphere, power of cylinder, and rotation of cylinder axis.

In one embodiment, juxtaposition of the suspect optical system and the corrective lenses is made by placing the lenses as close together as possible and applying correction to the produced equal and opposite powers generated. In another embodiment, relay optics are used so that the relayed image of corrective optics is preferably coincident with and to the suspect optics to produce lens meter measurement, substantially without a correction factor.

The system is designed so that the above-described straight line targets can be imaged by conventional methods or include knife edge images of a light source imaged through both the corrective optics and the suspect optics to form a uniform lens image of the suspect optics of the Focault variety. In this latter embodiment, the Focault variety image configuration furnishes a telltale indication of the type and sense of correction necessary to reach the desired equal and opposite prescription. Hunting for the correction of the suspect optical system correction is avoided. Provision is made for remote manipulation of the continuously variable optics to determine prescription automatically. Determination can occur in sphere, cylinder and prism.

OBJECTS AND ADVANTAGES OF THE INVENTION

An object of this invention is to disclose a lens meter which includes no rotation of measuring elements with respect to the axis of a suspect optical system to obtain measurement. To this end, continuously variable spherical lenses disclosed in U.S. Pat. No. 3,507,565, issued Apr. 21, 1970, entitled "Variable-Power Lens and System," and U.S. Pat. No. 3,305,294, issued Feb. 21, 1967, entitled "Two-Element Variable-Power Spherical Lens" may be used in combination with variable astigmatic lenses described in U.S. Pat. No. 3,751,138, issued Aug. 7, 1973, entitled "Variable Astigmatic Lens and Method for Constructing Lens." These lenses or other optics are arrayed as set forth in U.S. Pat. No. 3,822,932, issued July 9, 1974, entitled "Optometric Apparatus and Process Having Independent Astigmatic and Spherical Inputs." By the use of specialized straight line targets for the determination of astigmatic and spherical correction all as set forth in U.S. Pat. application Ser. No. 452,232, filed Mar. 18, 1974, entitled "Process and Apparatus for Astigmatic and Spherical Subjective Testing of the Eye, now U.S. Pat. No. 3,947,097 issued Mar. 30, 1976;" (hereinafter incorporated by reference in this disclosure), determination of the correction of suspect optics can be made without rotation of any element in the lens meter.

An advantage of this invention is that it fully incorporates all advantages set forth in my copending U.S. Pat. application Ser. No. 452,232, filed Mar. 18, 1974, now U.S. Pat. No. 3,947,097, issued Mar. 30, 1976, entitled "Process and Apparatus for Astigmatic and Spherical Subjective Testing of the Eye." It should be understood that the objects and advantages accruing to the patient and examiner in that disclosure accrue to the operator optics of this disclosure.

A further object of this invention is to disclose a lens meter where the image analyzed is passed through the entirety of the suspect optical system being analyzed. In the case of conventional glasses, the entire lens of the glasses can be used in the test. The uniformity of correction present over an entire suspect optical system can be measured. In the case of glasses having discrete segments with discrete prescriptions (for example, bifocals), the entirety of the segment being analyzed can be used to measure uniformity of that segment.

An advantage of this aspect is that numerous measurements through repeated small segments of suspect optics need not be made. One measurement through the entirety of the lens can result in an examination testing not only the lens but its uniformity over the entirety of its optically active surface.

Another object of this invention is to disclose a lens meter having a projected image onto a screen. In accordance with this aspect of the invention, the image from a projector is projected through both the corrective optics and the suspect optics and imaged onto a screen.

An advantage of this aspect of the invention is that the operator views the screen onto which the target is projected. Thus, astigmatic or spherical errors in the operator's eye cannot introduce spurious sources of imperfection into measurements.

A further advantage of projecting an image onto a screen is that the screen in turn can be equipped with photosensors. Such photosensors can provide for automated manipulation of the corrective optics. The result is a machine which can automatically measure the correction of a suspect optical system.

A further object of this invention is to disclose a line target for projection through both a suspect optical system and accompnaying corrective optics. When the line target is imaged to optimum, the corrective optics are moved to an equal and opposite correction with respect to the suspect optical system.

An advantage of the line target of this invention is that it is possible to measure image sharpness by photosensor techniques already known. For example, by observing a maximum photosensor output associated with a sharply focused image, an easily detectable photosensor output indicative of measurement of the suspect optical system results. Thus, the photosensor through its electrical output can indicate image correction.

A further advantage of the line target of this invention is that it is readily adapted to automated detection of the suspect optical system correction. By manipulating lens elements in sequence and looking for the maximum of photosensor output, remote determination of suspect optical system correction can be made.

A further object of this invention is to disclose a lens meter which projects an image of a lens. According to this aspect of the invention, a knife edge image is projected through the suspect optics and the continually variable optics. When the continuously variable optics are not equal and oppositely corrective of the suspect optics, characteristic images are produced. These characteristic images furnish telltales of the type of correction and sense of correction necessary to reach an optimum countercorrection at the continuously variable optics.

An advantage of the imaging of the suspect optical system in accordance with this invention is that it is possible to remotely monitor by photosensors an image on a screen and have the photosensors transmit remotely to the corrective optics the necessity for and direction or sense of correction required in sphere and cylinder. Hunting to determine direction of correction require is avoided.

A further advantage of the imaging of the lens in accordance with this invention is that it adapts the knife edge principle of a Focault optical test to a lens meter. Since the Focault knife edge procedure has been shown to have high optic accuracy, a superior and accurate lens meter measurement results.

A further object of this invention is to disclose a lens meter in which a relay optical system projects an image of the continuously variable optics to overlie the suspect optics. Thus, the suspect optics and corrective optics are effectively brought into coincidence. The need for compensation for the spatial intervals separating the corrective optics and suspect optics is greatly reduced.

A further advantage of this lens meter is that it can be readily constructed and attached to that eye testing apparatus disclosed in U.S. Pat. No. 3,874,774, issued Apr. 1, 1974, entitled "Eye Testing Apparatus."

Yet another object of this invention is to disclose a completely automated system for a lens meter. This system provides for the insertion of a lens followed by the automated readout of the correction provided by the lens meter.

Yet another object of this invention is to disclose a lens meter which readily reads out prism correction. In accordance with this aspect of the invention, an image is projected onto a screen. By either measuring the deflection of the image at the screen or introducing prism optics to produce no deflection at the screen, prismatic correction in suspect optics can be rapidly and remotely determined.

Still another object of this invention is to disclose a system for the measurement of the correction of suspect optics which does away with prism in mesurement. Thus, with the lens meter herein disclosed, measurement of the suspect optical system can first occur in sphere and cylinder with prism neutralized. Later, measurement can occur with prism included. Thus, prism can be subsequently measured as an effectively isolated component of the suspect optical system.

Other objects, features and advantages of this invention will become more apparent after referring to the following specification and attached drawings in which:

FIG. 1 is a schematic of one embodiment of the lens meter of this invention illustrating the projection of a line target through continuously variable spherical and astigmatic lenses with relay of the image of such lenses to overlie a suspect optical system (here shown as a pair of glasses) and with the ultimate projection of the line target on a screen;

FIG. 2a is a schematic of the lens meter of this invention illustrating the projection of a Focault type image of the lens of a suspect optical system onto a screen with the lens of the suspect optical system backed by a retrodirecting reflective surface for measurement of suspect optical sytems in sphere and astigmatism only;

FIG. 2b is a schematic of a plane reflecting surface for backing a suspect optical system for measurement of prism;

FIG. 2c is a schematic of the retrodirecting reflective surface for measurement of the suspect optical system where sphere and astigmatism are equally and oppositely matched;

FIG. 2d illustrates the retrodirecting reflective surface with sphere of astigmatism improperly balanced leading to a convergence of light;

FIG. 2e is a schematic of the retrodirecting reflective system with sphere or astigmatism improperly balanced to result in a divergence of light;

FIGS. 3a–3e are figures taken from my copending U.S. Pat. application Ser. No. 452,232, filed Mar. 18, 1974, now U.S. Pat. No. 3,947,097, issued Mar. 30, 1976, which application is incorporated herein by reference, these figures illustrating the manipulation of the line target shown in the apparatus of FIG. 1 through suspect optics to a screen;

FIGS. 4a–4c are examples illustrative of the characteristic Focault type image produced by the embodiment of FIG. 2a with the Focault type image indicating the optical correction required and the direction of correction necessary;

FIG. 5 is a schematic of this invention illustrating an alternate embodiment of the target connected to photoelectric circuitry for remotely determining sphere, cylinder and prism of a suspect optical system;

FIG. 6 is an alternate embodiment of the lens meter of this invention utilizing a silvered mirror as the knife edge; and, FIG. 7 is a schematic of a portion of the apparatus of FIG. 5 here shown wired for the remote detection of prism in a suspect optical system.

Referring to FIG. 1, a schematic of one embodiment of the lens meter of this invention is illustrated. Suspect optics A in the form of the right lens of a pair of spectacles 30 is shown being analyzed for corrective power. Typically, lens A is placed within a holder (not shown) and securely braced against any movement with respect to the light path. It should be understood that the phrase "suspect optics" is used in the specification in a form to have broad meaning. It includes virtually any optical system which included one or more of the components of sphere, cylinder and/or prism. This term, as herein used, excludes optics of the eye; these optics of the eye and their correction are covered by my copending U.S. Pat. application Ser. No. 452,232, filed Mar. 18, 1974, now U.S. Pat. No. 3,947,097, issued Mar. 30, 1976, entitled "Process and Apparatus for Astigmatic and Spherical Subjective Testing of the Eye."

Variable optics B are complex optical surfaces. With brief reference to FIG. 3a, these surfaces are schematically illustrated as flat pieces of glass. The variable optic surfaces include one spherical lens pair 16 and two astigmatic lens pairs 18 and 20.

Spherical optics lens pair 16 is known. See Luis W. Alvarez U.S. Pat. No. 3,305,294, issued Feb. 21, 1967, entitled "Two-Element Variable Power Spherical Lens," and Luis W. Alvarez and William E. Humphrey U.S. Pat. No. 3,507,565, issued Apr. 21, 1970, entitled "Variable Power Lens and System."

Broadly, each element of spherical lens pair 16 is moved relative to the other element of spherical lens pair 16 responsive to the acuity of the particular targets selected. The spherical lens pair 16 moves gradually and continuously with relative movement of one lens element to the other lens element to generate either positive spherical power or negative spherical power.

First and second astigmatic optics lens pairs 18 and 20 are known. (See William E. Humphrey U.S. Pat. No. 3,751,138, issued Aug. 7, 1973, entitled "Variable Anamorphic Lens and Method for Constructing Lens.") First astigmatic optics lens pair 18 generates astigmatism components at 45° and 135° relative to the illustrated straight line target on screen E. Second astigmatic optics 20 generates astigmatism components parallel to and normal to the illustrated straight line target on screen E. In each case, change in the generated astigmatic components from each of the lens pairs 18, 20 is produced by relative movement of one element in the lens pairs relative to the remaining element in the same lens pair.

Regarding lens pairs 16, 18 and 20, the reader should realize that these are extremely complex optical surfaces. These extremely complex optical surfaces are here schematically shown as flat pieces of glass. Their complex surfaces can only be understood after referring to the referenced U.S. Pat. No. 3,305,294; 3,507,565; and 3,751,138.

Relay optics C are shown here in the form of a concave spherical mirror. Typically, the mirror is aligned with its axis 32 extending at equal angular intervals from the incident light path 34 and the reflected light path 35. Thus, it will be realized by those having skill in the art that the mirror is in effect used "off axis."

The relay optics could as well be a spherical lens in lieu of the concave mirror here shown. Alignment of the spherical lens can avoid problems associated with "off axis" correction of the relay optics.

It should be understood that the light path incident from projector D to screen E is at an angle relative to principle axis 32 of the focusing optics. It will be appreciated that the astigmatic effect due to the angle of incidence and the angle of reflection from focusing optics C can be eliminated by bending mirror C to impart to the mirror an aspherical surface to correct this astigmatic input. This much has been disclosed in my U.S. Pat. No. 3,874,774.

As used "off axis," mirror C functions to focus a real image at corrective optics B coincident to and over suspect optics A. Stated in other terms, the real image of corrective optics B makes corrective optics B the same as if they were located coincident with and to suspect optics A. Use of a field mirror to produce this optical coincidence with or to the eye of a patient (as distinguished from suspect optics in a lens meter) is disclosed in my previous U.S. Pat. No. 3,874,774, issued Apr. 1, 1975.

It will be appreciated that absolute coincidence between corrective optics C and suspect optics A with respect to relay optics C is not required. Adjustment can be made in accordance with the following formulae:

$$P_{sph} = P_s(1-d_sP_s) + P_o + \frac{P_x^2 d_x}{2} + P_+^2 d_+ - 2P_oP_sd_s$$

$$P_{Diag} = P_x - 2d_sP_xP_s$$

$$P_{Norm} = P_+ - 2d_sP_+P_s$$

where:
$P_{sph}$ is the corrected power of sphere;
$P_{Diag}$ is the corrected power of diagonal astigmatism;
$P_{Norm}$ is the corrected power of normal astigmatism;
$P_s$ is the power of sphere of any supplemental spherical optics in the system;
$P_+$ is the power of astigmatism at variable astigmatic optics 18;
$P_x$ is the power of astigmatism at variable astigmatic optics 20;
$P_o$ is the power of spherical correction at variable spherical lenses 16;
$d_s$ is the distance between the relayed position of any supplemental spherical optics and the suspect optics A;
$d_+$ is the distance between the relayed position of the variable astigmatic optics 18 and the suspect optics A; and,
$d_x$ is the distance between the relayed position of the variable astigmatic optics 20 and the suspect optics A.

It should be noted that the equation assumes coincidence between the relayed position of the variable spherical optics 16 and the suspect optics A. Similar corrections can be developed for the case where the relayed spherical optics and suspect optics are not coincident.

In addition, the diopter correction for suspect optics A by a correction factor Dp is related to the diopter correction at the corrective optics Dc as follows: $D_p = Dc(M^2)$ where M is the ratio of the relay optics (field mirror) to the corrective optics distance over the relay optics to the suspect optics distance.

Typically, a light source 40 with associated reflector 41 projects light through slide 42. This light is projected by projecting optics 44. Projecting optics 44 transmit light in the direction of field mirror C.

Screen E receives an image of slide 42. This image results from the projected light being focused to the screen by screen focusing optics 46.

It will be readily understood that where variable optics B and suspect optics A are removed from the light path, light transmitted from projector D to screen E would result.

To understand the operation of the apparatus of FIG. 1, reference must be had to FIGS. 3a-3e. These figures can be best understood by reference to my copending U.S. Patent Application Ser. No. 452,232, filed Mar. 18, 1974, now U.S. Pat. No. 3,947,097, issued Mar. 30, 1976, entitled "Process and Apparatus for Astigmatic and Spherical Subjective Testing of the Eye." This application is herein incorporated by reference.

This patent application includes an abstract of the disclosure as follows:

"An apparatus and process for determining subjective astigmatic and spherical prescription for the eye is disclosed. A target, consisting of a straight line, is focused for maximum clarity by the adjustment of spherical optics, causing the line to become proximate to the retinal viewing plane of the eye. Change of astigmatic correction is made along at least one axis diagonal to the line until maximum sharpness of the line results, without resultant spherical change and resultant movement of the image away from the retinal plane of the eye being tested. A second target, again consisting of a straight line, is introduced; this line target is angularly inclined to the first target, preferably at 45°. Spherical adjustment is made to obtain subjective line sharpness. Change of astigmatic correction is made along at least one axis diagonal to the line until maximum sharpness of the line results, without resultant spherical change and resultant movement of the image away from the retinal plane of the eye. By the expedient of vector analysis of the two astigmatic components, astigmatic correction can either be plotted on Cartesian coordinates (in accordance with a technique recently developed), or conversion to the more conventional polar description of astigmatism using cylinder power and rotation can occur. A specialized line target consisting of three point source smeared by the superimposition of strong cylinder in the range of 4 to 12 diopters is disclosed. This specialized target, when the point sources are arrayed in a triangular configuration, can be adjusted using patient Vernier visual acuity, a visual acuity common to a high degree in large numbers of the population."

This application includes allowed claim 1 as follows:

"1. A process for determining optometric prescription for the eye including the steps of: providing a patient viewing station; providing at least one first straight line target of first arbitrary preselected angular alignment without regard to any suspected principal axis of the patient's eye to a view path from said patient viewing station; providing in said view path variable spherical optics to vary the spherical correction of said target as viewed by said patient; varying the spherical correction responsive to subjective patient visual acuity of said first straight line target; providing in said view path first variable astigmatic optics for varying astigmatic lens power along first intersecting diagonals at substantially equal and opposite angles from the preselected angular alignment of said first straight line target; said first variable astigmatic optics varying said astigmatic power from positive to negative along one axis of said intersecting diagonals and from negative to positive along the other axis of said first intersecting diagonals varying the first variable astigmatic optic responsive to subjective patient visual acuity of said first target to obtain a first component of astigmatic prescription for each patient."

It will be noted upon comparison of the two applications that the chief difference in the schematic figures of FIGS. 3a-3e is the substitution of the subject optics for the eye of the patient. Further, the figures here represented can be best understood by realizing that the projector apparatus B and the relaying optics C are omitted in the schematics of FIGS. 3a-3e.

Referring to FIG. 3a, a schematic diagram in partial perspective illustrating an apparatus which can be used for the projection of the straight line target of this invention is illustrated. Viewing this perspective and schematic view from left to right, a projected target T consisting of a straight line 14 is projected from the projecting apparatus (omitted in FIGS. 3a-3e). Typically, straight line 14 is a line of one minute of arc or less (this dimension being the minimum of visual acuity of the eye), although coarser targets may also be useful.

Target T can be generated in any number of conventional ways.

Suspect optics A, schematically illustrated as a circular lens, has collimated light including the image of target T projected through the corrective optics, through the suspect optics, to the imaging lens 46. Manipulation of the corrective optics occurs until the light passing through imaging lens 46 images on screen E. Responsive to the focus of a first straight line target T on screen E, adjustment is made to the spherical variable lens pair 16 (for the first time), the first astigmatic power lens pair 18. Responsive to the focus of a second straight line target (diagonal to the first straight line target) adjustment is made to the spherical optic lens pair 16 (for the second time), and finally to the second astigmatic lens pair 20. This movement and its optical effect may now be set forth.

Referring to FIG. 3a, relative movement of the spherical lens elements 16 is made responsive to maximum or optimum visual acuity of line 14. Movement of the line to coincidence with screen E results as illustrated in FIG. 3b.

As shown in the extreme right of FIG. 3b, line 14 does not appear with its full optical clarity on screen E. This is because the ambient astigmatism of the suspect optics A along diagonals relative to straight line 14 causes the edges thereof to be blurred. It therefore remains to correct these astigmatic aberrations without causing resultant spherically related movement of line 14 out of the screen E.

Referring to FIG. 3c, first astigmatic lens pairs 18 have been moved relative to one another to cause optimum visual sharpness to line 14 at screen E. Since the first astigmatic lens pairs produce correspondent negative and positive, or positive and negative astigmatic lens power along perpendicular axes — each of which is diagonal to the vertical line target 14 — improvement of the focus of line target 14 results without any change in the overall focal length. This adjustment produces the final astigmatic measurement for one component of astigmatism (the only qualification being that it may be desirable to repeat the sequence immediately above outlined to optimize the optical setting).

Referring to FIG. 3d, new line target 21 has been placed in the projector. Preferably, this line target should be at an altered alignment of 45° with respect to line target 14. It should be noted, however, that precise 45° alignment change of the target is not required. Changes in target alignment 30° or more can produce tolerable results.

Referring to FIG. 3d and remembering the sequence of FIGS. 3a–3c, it will be remembered that the astigmatic aberration of the suspect optics will cause new line target 21 to have a different focal length with respect to screen E as projected through lens 46. Therefore, a second spherical correction will be made at spherical lens pairs 16. This adjustment will be made responsive to maximum clarity of the new line target 34 at screen E and will cause the best focal impingement of line target 21 to fall on screen E.

A surprising result occurs at this juncture of the process of this invention. The second adjustment of sphere to coincide the straight line target 21 with screen E causes the final spherical power to be known. This occurs even though the final astigmatic component is not known. Moreover, determination of the final astigmatic component will not affect the final spherical setting of the illustrated instrumentation. Therefore, the second astigmatic lens pairs 20 could just as well have been manipulated prior to the spherical optics 16 to obtain the final astigmatic component of the suspect optics A.

Referring to FIG. 3e, second astigmatic optics lens pairs 20 are translated one to another responsive to maximum visual acuity. The final component of astigmatism is attained. Again, since the respective negative and positive, or positive and negative axes of astigmatic adjustment are at substantial 45° alignment to the straight line target 34, no resultant movement off of screen E can occur. Moreover, this adjustment is the final adjustment in the process of this invention, giving the final coordinate of the desired astigmatic measurement of the suspect optics.

It should be understood that the sequence of steps herein set forth can be repeated. This may be done to optimize the measurement obtained or alternately to check the measurement accuracy. It should also be understood that the physical position of the lens pairs 16, 18 and 20 may be permuted, if desired, without invalidating the procedure. Further, it should be noted that for each line target 14 of FIGS. 3a, 3c and each line target 21 of FIGS. 3d and 3e, adjustment is required of only two, never three, optical elements. Thus, for target 14 only, spherical optics 16, first astigmatic optics 18 are adjusted. Second astigmatic optics 20 are not adjusted. Likewise, for target 34, only spherical optics 16 and second astigmatic optics 20 are adjusted; first astigmatic optics 18 are not adjusted.

It should be noted in the procedure herein outlined that the collimated light passing from target T may be passed in the entirety through the suspect optics A. Thus, the entire lens in its uniformity of manufacture can be measured in the process. This avoids needless repetition of the procedure at numerous small points throughout the lens.

Having set forth the operation of the embodiment set forth in FIG. 1, attention can now be directed to the embodiment of FIG. 2a.

Referring to FIG. 2a, an alternate embodiment of this invention is illustrated. This embodiment operates by the projection of a straight line target of a knife edge image and produces, when in focus, a lens image not unlike that kind of image produced by a Focault type optical test commonly used with spherical and parabolic mirrors. It should be understood that the characteristic image produced differs radically.

Referring to FIG. 2a, a lamp 50 and reflector 51 project a ray of light past a knife edge frame 52. Knife edge frame 52 includes two active edges, these edges being edge 53 (here shown as vertical) and edge 54, inclined at 45° from the vertical. The entirety of the projector and knife edge is herein referred to as knife edge projecting optics F.

The image of the knife edge from knife edge projecting optics F is collimated at a collimating lens 44, passes through a beam splitter 60, and then through variable optics B. Light then proceeds through the suspect optics A and then to retrodirecting optics G.

Retrodirecting optics G have the purpose of eliminating from the analysis of the suspect optics A any and all prism. Here, such optics are shown in the form of a spherical lens 65 and a reflector 66. Reflector 66 is chosen to have a radius of curvature approximately equal to the focal length of the positive spherical lens 65. Lens 65 and reflector 66 are best adjusted to reimage lens A back upon itself. Light is reflected back at an angle precisely equal to its angle of incidence.

It should be understood that other retrodirecting optics could as well be used. It is required that the optics retrodirect and displace light. Optics which merely retrodirect light without imparting appreciable displacement will not work. For example, a corner cube mirror array could be substituted for the retrodirecting optics G illustrated, provided account is taken of the optical path between lens A and its mirrored image.

It is believed instructive to set forth how a ray of light L impinges on the retroreflecting optics G.

With respect to FIG. 2c, and assuming that the variable lens pairs B (not shown in FIG. 2c) are equal and opposite to the prescription of suspect optics A, a light ray L from one portion of the lens will pass through the suspect optics A, spherical lens 65 and reflector 66. Light ray L will be reflected at the center line 67 of reflector 66 and pass outwardly through lens 65 and suspect optics A and through the variable optics. In passing to and from suspect optics A, the light will be collimated.

Where suspect optics A and the variable optics B do not produce equal and opposite direction one to another, light ray L passing between the suspect optics A and spherical lens 65 will be other than collimated. In the case where it is slightly convergent, it will impinge above the center line 67 at reflector 66 and pass upwardly and through spherical lens 65 and converge downwardly to the suspect optics A. As a result, the apparent divergence of the beam after having returned through the optical system will be increased (doubled in this case).

Likewise in FIG. 2d, suspect optics A and variable optics B act to diverge light shown at ray L". The ray again will impinge at reflector 66, this time below center line 67. Retroreflection through spherical lens 65 will return the beam through suspect optics A with increased divergence. Again, the characteristic patterns indicating an out of focus condition will result at screen E. These latter characteristic patterns will hereinafter be set forth with respect to FIGS. 4a–4c.

It should be noted that if the light ray L, L' or L" of FIGS. 2c, 2d or 2e were retrodirected upon themselves, the apparatus of this invention would not work. It is required that there be retrodirection and displacement so that deviations from the condition of collimation between the suspect optics A and the retroreflecting mechanism G can be detected to produce the characteristic pattern of FIGS. 4a–4c.

Referring again to FIG. 2a, once light is retrodirected at the retrodirecting optics G, it again passes through the variable optics B and impinges upon beam splitter 60. At beam splitter 60, approximately one quarter of the light projected past the first knife edge 53 or 54 is directed downwardly to and upon focusing optics 46'. Focusing optics 46' focus the original slit from slide 52 onto a knife edge.

Slide 72 (similar to slide 52) includes two active knife edge surfaces. A first knife edge 73 in slide 72 is the counterpart of the knife edge 53 in slide 52. A second knife edge surface 74 in slide 72 is the counterpart of knife edge 54 in slide 52.

Slides 52 and 72 differ in one important aspect. Slide 52 is peripherally dark and transparent. Slide 72 is peripherally light and dark in a central portion including knife edges 73, 74. It will be understood that the central portion of slide 52 will be generally smaller than the central portion of slide 72.

Once focusing optics 46 form an image at the knife edge, the light then passes to a screen focusing lens 80 and thence onto focus at screen 82. Lens 80 is chosen so that it relays an image of the suspect optics A to the screen 82. Thus, screen 82 has projected onto it an image of the suspect optics.

Having set forth this much of the disclosure, the theory of operation of the knife edges can now be set forth. This is best understood with reference to FIGS. 4a–4c.

It should be understood that the procedure outlined in FIGS. 4a–4c is for two parallel knife edge surfaces only (for example, knife edges 53 and 73 in combination). Further, and with respect to the variable astigmatic optics, the adjustment of these optics will always cause astigmatic component adjustments diagonally to the particular knife edge surfaces being used.

It will be noted that the particular knife edge array here illustrated includes two knife edge arrays, each at 45° one to another. The first array are edges 53 and 73. The second array are edges 54 and 74. These edges can be permanently aligned and worked on in sequence. For example, edges 53 and 73 can be worked in the manner illustrated in FIGS. 4a–4c by variable spherical optics 16 and first astigmatic optics 18. Later, knife edges 54 and 74 can be worked on by variable spherical optics 16 and second astigmatic optics 20 to obtain the final measurement of a suspect optical system A. To avoid repetition, the process of working on only one knife edge image is described.

Referring to FIGS. 4a–4c, a schematic of one knife edge is shown. The combination of the suspect optics A and the corrective optics B is shown as circular lens segments H. Light projected past these respective segments H impinges upon or past a knife edge K. As in the case of FIG. 2a, a lens 80 relays a real image of suspect optics A to screen E. The light proceeds to a screen E where it is imaged. All other optics illustrated in FIG. 2a have been omitted.

It should be understood with respect to screen E that the screen here shown receives the impingement of light on one side and projects the resultant image through to the opposite side. Thus, the views of the screen E in FIGS. 4a–4c are from the rear of the screen. Moreover, only one knife edge K is illustrated in each case. It is required to obtain complete prescription that two knife edges be used, one being preferably at 45° to the other knife edge. Normally, when one knife edge is tested to complete the procedure, it is blocked off. It is then replaced by a second knife edge, which knife edge is preferably at 45° and at least at 30°.

Referring to FIG. 4a, let us consider the case where the combined optical output of variable optics B and suspect optics A contains astigmatism. Movement of the variable astigmatic optics 18 to obtain an equal and opposite output to suspect optics A has not yet occurred. It will be noted that for each knife edge K, the components of astigmatism measurable will be at diagonals to the knife edge. For example, as illustrated in FIG. 4a, a component of astigmatism is illustrated (say, in the order of one diopter) converging or positive at 45°, and negative or diverging (again, in the order of one diopter) at 135°. The knife edge itself is aligned at 90°.

Assuming that the combined optics of the variable lens B and the suspect optics A produce astigmatism along the components as illustrated, it will be seen that light above the zero degree axis of the lens system will be deflected away from the knife edge. This can be seen at arrows 100, 101 and 102. Conversely, light below the zero degree axis will be deflected into the knife edge. This can be seen at arrows 103, 104 and 105.

When the lens of the suspect optics A is imaged at screen E by lens 80, the resultant image of lens A' at screen E will include an upper half 109 which is dark, and a lower half 110 which is illuminated. A terminator 111 will extend between the dark and light portions. As can be seen, where astigmatism is present, the terminator 111 will be aligned at zero degrees, which is at right angles to the knife edge.

Thus, it can be seen that astigmatism will produce an extremely characteristic image with the terminator at right angles to the knife edge. Moreover, with positive cylinder at 45° and negative cylinder at 135°, the image is dark at semicircular segment 109 and light at semicircular image 110. Conversely, with negative cylinder at 45° and positive cylinder at 135°, the image will be reversed; the image will be light at semicircular segment 109 and dark at semicircular image 110.

Referring to FIG. 4b, the characteristic image A" is illustrated. This image A" illustrates the case where suspect optics A and variable optics B illustrated as the combined lens system H' includes only sphere. In this case, the suspect optics A and the variable optics B have no astigmatism component but do combine to have a positive spherical output.

Taking the same circular segments of the lens system, and assuming one diopter of positive sphere, it will be seen that light will be deflected always inwardly as indicated by arrows 120–126. Taking an axis of 90° which is parallel to the knife edge K, it will be seen that light impinging upon righthand segment of lens system H' will be deflected away from the knife edge. This light, when projected by lens 80 as an image of suspect optics A, will produce a semicircular image 129 on the lefthand side of screen E. Conversely, light from the lefthand segment of the schematic lens system H' will be deflected into the knife edge K. Thus, a darkened portion of the image will be formed at the right circular segment 130. In this case, a terminator 131 will divide the two image segments. Thus, an image with this alignment will be characteristic of uncorrected sphere.

The presence of a negative spherical component from the combined optics of suspect optics A and variable optics B will produce the opposite result. In that case, segment 130 will be illuminated with segment 129 remaining dark. Arrows 120–126 will be reversed.

Finally, let us consider the case of FIG. 4c where both the spherical and astigmatic components are present. Thus, the suspect optics A and the variable optics B combine to have both sphere and astigmatism. Examining schematically represented lens system H", a spherical element is present. This spherical element includes a positive spherical lens effect, say, in the order of one diopter (+1 diopter).

At the same time, an astigmatic effect is present as schematically shown at combined element H. This astigmatic effect includes a positive cylindrical astigmatism at 45°, say, in the order of +1 diopter, and a negative astigmatism at 135°, say, in the order of −1 diopter.

The resultant vectors are plotted at the schematic optics (combining suspect optics A and variable optics B). Using the numerical example set forth above, the segments of the lens will include a 2.0 diopter component directed normal to the 135° axis of the lens. Vectors 142, 143 of the lens segments at 45° will include two diopter lens effects: vector 142 will be directed towards the 135° axis; vector 143 will be directed towards the 135° axis, this time in opposite direction to vector 142.

Taking the lens segments on the 135° axis, it will be seen that the positive sphere power of one diopter and the negative cylinder power of one diopter are equal and opposite. Simple vectorial analysis will indicate that the lens segments at 144 and 145 will produce no vector whatsoever.

The resultant image of the suspect optics A'" at screen E will be characteristic of this combination of sphere and astigmatism. Specifically, a semicircular dark portion 159 will appear above and to the right on screen E. Likewise, a characteristic light portion of the image of the suspect optics will appear below and to the left. A terminator between the two will be diagonal to the knife edge at 161.

It will be likewise apparent that equal and opposite lens imaging effects will be present if the combination of sphere and astigmatism of suspect optics A and variable optics B (shown together at H) is likewise equal and opposite.

Thus, it can be seen that the combination of the suspect optics A and the corrective optics B produces at screen E images which are characteristic in at least two aspects. These images are characteristic in that they note not only whether sphere, astigmatism, or both are present, but also in that they represent the type of correction required to bring the combined effect of the optics to a neutral setting.

For example, taking the case of FIG. 4c, the variable astigmatic element adjusting astigmatism diagonal to the knife edge K can first be manipulated. It would be manipulated until the terminator 161 fell upon a vertical axis such as that shown at 131. Thereafter, the spherical component could be manipulated. This component would be manipulated until a uniformly illuminated and circular image having the outline of the suspect optics A appears on screen E. This would be the circular image illustrated on screen E in FIG. 2a. This image is uniformly bright and contains no differential darkening from one portion of the image to another portion of the image. This measurement of the suspect optics will result in a final determination of one component of astigmatism.

Thereafter, by using diagonally aligned knife edge surfaces 54 and 74 (see FIG. 2a) and repeating the above-described process, measurement in the final component of astigmatism and the final component of sphere results. Complete system measurement in sphere and astigmatism results.

It will be remembered that retrodirecting optics G were used; they have the purpose of eliminating from the analysis of the suspect optics A any and all prism. Assuming that a sequence of adjustment was followed to produce an image on screen E of the suspect optics A, it should be noted that the image produced will be centrally located.

Taking away the retrodirective optics G and substituting behind the suspect optics A, a plane mirror 170a will no longer neutralize prism. The image will be displaced in accordance with prismatic output of the suspect optics A. Likewise, the image appearing on screen E will also be displaced.

Assuming that the spherical and astigmatic components of suspect optics A have been completely eliminated in accordance with the procedure set forth in FIGS. 4a–4c, determination of the remaining prismatic component then is a relatively simple affair. Specifically, by displacing lens 46' along coordinates 170 and 171 to cause the slit edges to become coincident again and reading out the displacement in diopters of prism, prism can effectively be measured as an isolated component.

It will likewise be realized that the displacement of lens 44 could as well be used as a measure of prism.

It should be understood that where lenses 44' or 46' are displaced, the resultant determination of prism can be made to be very precise with the alignment of one edge. This determination of prism uses the entirety of the lenses.

Having set forth both the optics in their configuration and practical operation, attention can now be directed to FIG. 5. In FIG. 5, an apparatus is schematically illustrated for a remotely operated lens meter for automatically determining sphere, cylinder and prism of a suspect optical system A.

Referring to FIG. 5, a lamp 100 is shown illuminating a line target 105. Line target 105 is, in this example, made up of a number of apertures 106. Fiber optics 103 direct light from lamp 100 to the apertures 106. A straight line target composed of a series of illuminated point sources of light results.

A similar light source 110 is utilized to communicate light through fiber optics to a straight line target 108 through a precisely similar mechanism. As has heretofore been explained, only one straight line target 106 or 108 will be illuminated at one time. In the explanation here, operation of straight line target 106 will be discussed. To avoid repetition, use of the apparatus with respect to straight line target 108 will be abbreviated.

The image of the straight line target is collimated at collimating lens 44'. It thereafter passes through a beam splitter 60 and then through variable optics B. Light then proceeds through the suspect optics A and then to the retrodirecting optics G.

Once light is retrodirected at the retrodirecting optics G, it then passes through the variable optics B and impinges upon the beam splitter 60. At beam splitter 60, approximately one quarter of the light projected by the straight line target 106 is directed downwardly to and upon focusing optics 46". Focusing optics 46" focus the original line target 106 from target 105 on o a vertically aligned slit 114 in a barrier 115. Assuming that the straight line image 106 is coincident with slit 114, the light then passes to a focusing lens 80 and thence on to a focal plane coincident with the photosensitive surface at photo detector 120. As has previously been explained, lens 80 is chosen so that it relays an image of the suspect optics A onto the photo detector 120. Thus, the photo detector 120 has projected onto it an image of the suspect optics.

Remembering the embodiment of FIG. 2a as well as the explanation of the theory of operation of FIGS. 4a–4c, observations about the projected image at photo detector 120 can now be made.

First, assuming that the correction of the variable optics B is equal and opposite to the suspect optics A, photo detector 120 will have projected onto its surface a uniformly illuminated image of the suspect optics A.

Assuming further that there is diagonal astigmatism, a characteristic image of photo detector 120 will result similar to that shown in FIG. 4a.

Assuming that there is a sphere correction, a characteristic image at photo detector 120 will occur as shown at FIG. 4b.

Assuming that there is both astigmatism and sphere, a characteristic image at photo detector 120 will occur along the line of that described in FIG. 4c.

It thus remains to operationally connect photo detector 120 to remote apparatus for actuating variable spherical lens pairs 16 and variable astigmatic lens pairs 18 and 20 to cause remote movement of the lens pairs to determine remotely prescription of the suspect optics A.

Photo detector 120 is a TYPE 640 4-QUADRANT DETECTOR manufactured by Electro-Nuclear Laboratories, Inc. of Menlo Park, Calif. It consists of four sensitive quadrants on a single wafer. This wafer is capable of producing differential output signals from its electrodes with the use of connected differential amplifiers. The differential output results when the image has differential illumination at the surface of the photo detector 120.

In explaining the circuitry here used, I will first set forth the wiring schematic for correcting sphere and astigmatism. Its operation will thereafter be set forth.

Secondly, I will consider remote detection of prism by describing first the wiring and thereafter the operation.

It will be noted that the quadrant outputs of photo detector 120 are each used. Quadrants 120a and 120b are aligned to slit 114. Similarly, quadrants 120c and 120d extend on either side of slit 114.

Photo detector quadrants 120c and 120d connect to an operational amplifier 121 and connected amplifier 122. Power from amplifier 122 is communicated through paired power leads 124 to a motor 125. Motor 125 drives a gear 126 which connects to a cam operated wheel 130. Dependent upon the differential illumination at quadrants 120c and 120d, motor 125 drives in a first direction of rotation or a second direction of rotation. As the parity of the photo detector electrical connections can be empirically determined by a skilled mechanic in the art, it will not be set forth here.

Photo detector quadrants 120a and 120b connect to an operational amplifier 127 with a connected amplifier 128. Power from amplifier 128 is communicated through paired power leads 130 to a motor 132. Motor 132 drives a gear 133 which connects to a cam operated wheel 140. Dependent upon the differential illumination at quadrants 120a and 120b, motor 132 drives in a first direction of rotation or a second direction of rotation.

Switches 142 and 145 are linked by a common toggle. Switch 142 is closed when diagonal astigmatism (as in FIG. 3c) is measured and open when normal astigmatism (as is FIG. 3e) is measured. Conversely, switch 145 is open with diagonal astigmatism is measured, and closed when normal astigmatism is measured.

For the measurement of normal astigmatism, opening of switch 142 closes switch 145 through the common toggle. Switch 145 through leads 150 drives a motor 155 and gear 156 to rotate a cam operated wheel 160.

Cam operated wheels 130, 140 and 160 are known. Specifically, they are a component of a product known as "Vision Analyzer" manufactured by Humphrey Instruments, Inc. of Berkeley, Calif. Moreover, the operation of the cam operated wheel to effect relative lens movement of variable spherical or astigmatic optics is set forth in my copending Patent Application Ser. No. 624,808, filed Oct. 22, 1975, entitled "Eye Test Apparatus With Physician Routed Patient Input Adjustment to Variable Optical Elements", now U.S. Pat. No. 4,015,899, issued Apr. 5, 1977. The description of the operation of the cam operated wheels can be found in the text of the application related to FIGS. 1 and 2.

Broadly, as cam operated wheels 130, 140 and 160 are rotated by their respective motors 125, 132 and 155, they cause variable optics B to relatively move. This occurs through cam and cable connections described in my copending Patent Application Ser. No. 624,808 and sold by Humphrey Instruments, Inc.

As can be seen, rotation of cam operated wheel 130 effects relative movement of the variable spherical optics 16. Rotation of cam operated wheel 140 effects variable movement of variable astigmatic optics 18. Rotation of the cam operated wheel 160 effects movement of the variable astigmatic optics 20.

Having set forth the description of this apparatus, its operation may now be described.

Typically, suspect optics A are placed in the position illustrated in FIG. 5 and line target 106 illuminated by turning on light source 100. Assuming that the combination of the combined optics of the variable lens B in the suspect optics A produces astigmatism as illustrated in the case of FIG. 4a, an image A' will appear at the surface of photo detector 120 (see FIG. 4a). Quadrants 120a and 120b will see a differential illumination corresponding to the segments of the image 109, 110 in FIG. 4a. Assuming that switch 142 is closed, the differential output of quadrants 120a and 120b of the photo sensor will drive motor 132. Motor 132 in turn will move variable astigmatic elements 18 backwards and forward relative to one another in a direction to eliminate the differential illumination at the photo sensor. Such movement will occur until the differential illumination is eliminated.

Assuming that the combined optics of the variable lens B and the suspect optics A produce sphere as illustrated in FIG. 4b, an image A" (shown in FIG. 4b) will be projected onto the photo sensitive surface of photo detector 120. In this case, quadrants 120c and 120d will see a differential illumination. This differential illumination will correspond to the segments 129, 130 in FIG. 4b. They will pass this differential illumination through leads 124 to motor 125. Motor 125 through its parity connection will drive cam operated wheel 130 to vary spherical elements 16 to again reduce the differential illumination at the photo sensor to zero.

It will be apparent to those having skill in the art that if an image A''' as shown in FIG. 4c impinges upon the photo sensor 120, a combination of both the foregoing effects will result. Motors 125 and 132 will be simultaneously actuated to eliminate the differential illumination produced at segments 159 and 161 of FIG. 4c.

As was set forth and described in the case of FIGS. 3d and 3e, in order for astigmatism to be completely determined and sphere to be finally determined, it is necessary to repeat the process heretofore described with a diagonally located line target 108. Abbreviating the description, it will be apparent that switch 142 is opened and switch 145 is closed through movement of the common toggle. Thereafter, motors 125 and 155 are driven to correct sphere and astigmatism respectively. The obtaining of an equal and opposite prescription at variable optics B to the suspect optics A in sphere and astigmatism results.

It should be noted that preferably the quadrants of the photo detector 120 are rotated 45° to align the slit 118 with quadrants 120a and 120b aligned to slit 118, and quadrants 120c and 120d on either side of slit 118. This can be done mechanically or electromechanically and is here omitted for convenience of description.

More complex detectors with greater numbers of segments of photosensitivity may be arranged and switched to avoid the necessity of rotation of photo sensor 120 or the electrical signals of detector 120 may be recombined with alternate wiring to establish an effective rotation of the detector sensitivities by 45°.

Having set forth the operation of the mechanism of FIG. 5 to determine cylinder and sphere, its operation to determine prism can now be set forth.

It will be remembered that when retrodirecting optics G were used, they had the purpose of eliminating from the analysis of the suspect optics A any and all prism. Taking away the retroreflective optics G and substituting behind the suspect optics A, a plane mirror results in an optical system which will no longer neutralize prism. A uniformly illuminated image will appear if prism is corrected; no image will appear if prism is not corrected and light is deflected into the mask. Similarly, any image of the line target 108 passing slit 118 in mask 115 likewise will be on or off center dependent upon prismatic input of the suspect optics A.

Referring to FIG. 7, the apparatus of FIG. 5 is shown again with two major exceptions. First, mirror 170 is shown behind suspect optics A replacing retrodirecting optics G. (See FIGS. 2a and 2b.) Second, photosensor 120 is illustrated operatively connected to remotely drive apparatus for determining the prism of the suspect optics A. For simplicity and understanding, photosensor 120 is shown with its quadrants wired for producing signals which can be useful in determining prism. Switching mechanism for combining the functions of FIG. 5 with those of FIG. 7 has been omitted.

Before beginning the description, it is assumed in the example set forth herein that variable spherical optics 16, variable astigmatic optics (diagonal) 18, and variable astigmatic optics (horizontal and vertical) 20 have determined the sphere and cylinder prescription of the suspect optics A. Thus, where the focusing optics 46" are registered so that an image passes through either slit 114 or slit 118, photosensor 120 will see a uniformly illuminated image. This uniformly illuminated image will be of the suspect optics A and will be substantially coincident with the entirety of the surface of the photosensor.

Assuming that light source 100 illuminates line target 106, any prism present in suspect optics A will be relayed to plane mirror 170a. Upon reflection, the image of line target 106 will no longer be coincident with slit 114. The surface of photo detector 120 will be dark.

The problem, therefore, is to register the image of line target 106 with slit 114 in screen 115.

Preferably, a motor 172 will be first driven so that the image of focusing optics 46" is displaced completely to one side or the other side of mask 115. Using this as a starting point, motor source 172 will be connected through a power source 174 by solenoid switch 175. The switch will commence to drive lens 46" to move the image of line target 106 towards slit 114. When photo detector 120 sees a brightly illuminated image, the image of line target 106 will be aligned with slit 114. Being so aligned, the movement of optics 46" will be proportional to the amount of prism present in the suspect optics A.

Referring to photo detector 120, it will be seen that each of the quadrants of the photo detector is wired through a resistance to a common bus. By closing a switch 178 to an amplifier 179, an actuating signal can be communicated to the relay 175. When the photosensitive surface of photo detector 120 sees a brightly illuminated image, amplifier 179 will emanate a signal. This will cause normally closed relay contacts 175 to open. Opening of relay 175 will stop movement of motor 172 and lens 46". The position of the lens 46" as moved by motor 172 will determine one component of prism, this component being normal to the line target 106.

Substantially, the same process and apparatus will be used for the determination of the component of prism normal to line 106. Again referring to FIG. 7, motor 182 is connected through a power source 184 and relay contacts 185. Typically, motor 182 is first actuated to drive optics 46" so that the image from line target 108 impinges at one extreme or another extreme on mask 115. Thereafter, relay 185 is closed and motor 182 commences to drive focusing optics 46" toward slit 118 in mask 115 along a direction of arrow 182a. By opening switch 178 and closing switch 188, each of the quadrants of photo detector 120 is connected to an amplifier 189. When the photo detector again sees the uniformly illuminated optics of suspect optics A through projecting optics 80, relay 185 is opened. Motor 182 stops and the position of focusing optics 46" can be read as a component which is along line 106. This can be done by measuring the translation of focusing optics 46" toward slit 118.

It should be understood that as here illustrated, it is preferred that sphere and cylinder first be determined. This gives a uniformly illuminated image at photosensor 120. It should be appreciated that with the quadrants of the photosensor connected as shown, prism could be determined first. This is especially true where the difference in correction between the variable optics 16, 18 and 20 and the suspect optics A is not extreme.

It has been mentioned and demonstrated that the straight line targets used with this optical system can be varied. For example, an optical line target has been illustrated in FIG. 1 including a plurality of lines. In FIG. 2, paired knife edge targets in alignment one with another have been utilized. In FIGS. 3a-3e, a single straight line target has been illustrated. In FIG. 5, a line target consisting of a plurality of point sources of light has been shown. These point sources are aligned to a corresponding straight line slit in a mask.

In FIG. 6, a line target consisting of the knife edge of a mirror is illustrated. Referring to FIG. 6, a lamp 200 projects its light onto the surface of a mirror having a knife edge 206. Mirror 206 projects its reflected image of the light source terminated at the knife edge 206 to collimating optics 244. The light then passes through the variable optics B, suspect optics A, and to retrodirecting optics G.

At the retrodirecting optics G the light rebounds. It passes again through suspect optics A, variable optics B, and the collimating optics 244 where it is focused at or near the knife edge. Light then passes to a screen focusing lens 280 whose focal length is placed to project an image of the suspect optics A on the screen E.

Two advantages of the operational setup herein disclosed can be briefly summarized. First, it is not required that the embodiment here shown precisely register two knife edges, one with another. Rather, the single knife edge 206 placed with respect to the retrodirecting optics G is the only alignment required.

Secondly, and upon precise equal and opposite input at the variable optics B to the input of the suspect optics A, tuning of the image at the screen E will be for maximum darkness and to eliminate differential illumination. As the theory of the knife edge has been set forth in detail with respect to FIGS. 4a-4c, it will not be repeated with respect to the embodiment illustrated in FIG. 6.

Thus, it will be apparent that an endless variety of straight line targets can be used in accordance with this invention. These straight line targets can include knife edges of many varying configurations. Likewise, other changes can be made to the specific embodiments herein disclosed without departing from the spirit of the invention.

It will likewise be seen that for prism to be accurately determined, especially with the prescription containing some sphere or some cylinder, the suspect optics must be placed in the lens meter with the center of the lens system overlying the optical axis of the lens meter. Where the prism of a pair of glasses is measured, the center of the lens system overlying the pupil of the patient's glasses will be the center of the lens system. It should be realized that the center of the lens system need not be precisely at the optical axis of the lens meter, so long as its placement with respect to the optical axis is accurately known.

The term "collimated" has been used in describing light passing through a suspect optical system A and variable lenses B. It will be realized that only substantial collimation is intended. Indeed, it is the deviation from a collimated transmission which gives the sense of the correction required. Further, in the interstices between the suspect optics A and variable optics B, the light is not collimated where correction is present and required.

I claim:

1. A process for measuring power of a suspect optical system in at least one component of cylinder including the steps of: mounting said suspect optical system in a light path; projecting light including an image of at least one first straight line target of first arbitrary preselected angular alignment without regard to any suspected principal axis of the suspect optical system along said light path; providing in said light path variable optics for movement to a power of sphere and cylinder substantially equal and opposite to components of sphere and cylinder in said suspect optics, said variable optics including variable spherical optics to vary the spherical component of light projected there through and variable cylinder optics for varying the astigmatic lens power along first intersecting diagonals at substantially equal and opposite angles from the preselected angular alignment of said first straight line target; projecting an image of said straight line target from said light passing through said variable optics and said suspect optics; and, varying said spherical optics and said first astigmatic optics to optimize the image of said projected straight line target.

2. The process of claim 1 and wherein said projecting and imaging of at least one straight line step includes projecting an image of at least one knife edge and imaging said knife edge from said light passing through said variable optics and said suspect optics.

3. The invention of claim 1 and wherein said projecting step includes projecting an image of at least one straight line from a slide.

4. The invention of claim 1 and wherein said step of projecting an image of said straight line target includes the step of projecting said image upon a screen.

5. The invention of claim 1 and including the additional steps of projecting light including a second image of at least one second straight line target, said second straight line target being at an angle oblique to said first straight line target; providing second variable cylindrical optics to said variable optics, said second variable cylindrical optics varying cylindrical lens power along second intersecting diagonals at substantially equal and opposite angles from the angular alignment of said second straight line target; and varying said spherical optics and said second cylindrical optics to optimize the image of said second projected straight line target after optimizing the image of said first straight line target.

6. An apparatus for measuring at least one component of cylinder of a suspect optical system comprising: means for projecting an image of a straight line target along a light path; means for holding relative to said light path a suspect optical system including possible components of optical sphere and optical cylinder; variable optics in said light path having an optical effect substantially coincident with said suspect optical system, said variable optics including variable spherical optics for varying the spherical correction and variable cylindrical optics for varying cylinder lens power along first intersecting diagonals at substantially equal and opposite angles from the preselected angular alignment of said straight line target; said variable optics movable to an optic power of sphere and cylinder equal and opposite to the optic power of said suspect optical system; and, means for projecting light passing through said variable optics and said suspect optics to project an image of said straight line target.

7. The apparatus of claim 6 and wherein said variable optics are located on said light path a distance from said suspect optics, and relay optics relay a real image of said variable optics to a position substantially coincident with said suspect optical system.

8. A process for measuring the suspect optical system in at least one component of cylinder including the steps of: mounting said suspect optical system in a light path; projecting light including an image of at least one first straight knife edge of first arbitrary preselected angular alignment without regard to any suspect principal axis of the suspect optical system along said light path; providing in said light path variable optics for movement to a power of sphere and cylinder substantially equal and opposite to the components of sphere and cylinder of said suspect optics, said variable optics including variable spherical optics to vary the spherical component of light projected and variable cylindrical optics to vary the cylinder lens power along first intersecting diagonals at substantially equal and opposite angles from preselected angular alignment of said knife edge; projecting an image of said knife edge from said collimated light to a knife edge after said light has passed through said variable optics and said suspect optics at least once; and, varying said spherical optics and said first cylinder optics to optimize the image of said projected straight knife edge.

9. The process of claim 8 and wherein said step of projecting an image of said knife edge after said light has passed through said variable optics and said suspect optics includes retrodirecting said light to pass through said suspect optics and said variable optics twice and projecting said image of said knife edge from said retrodirected light to said first straight knife edge of first arbitrary preselected angular alignment.

10. The process of claim 8 and wherein said step of projecting an image of said knife edge after said light has passed through said variable optics and said suspect optics includes retrodirecting said light to pass through said suspect optics and said variable optics twice and projecting said image of said knife edge from said retrodirected light to a second straight knife edge of first arbitrary preselected angular alignment with respect to said light path.

11. The process of claim 8 and including the step of projecting an image of said suspect optics to a screen and varying said variable optics to obtain a uniformly illuminated image of said suspect optics at said screen.

12. The process of claim 11 and wherein said image of said suspect optics is uniformly bright.

13. The process of claim 11 and wherein said image of said suspect optics is uniformly dark.

14. A process for measuring the power of a suspect optical system in at least one component of cylinder including the steps of: mounting said suspect optical system in a light path; projecting light including an image of at least one first straight line target of first arbitrary preselected angular alignment without regard to any suspected principal axis of the suspect optical system along said light path; providing in said light path variable optics for movement to a power of sphere and cylinder substantially equal and opposite to the components of sphere and cylinder in said suspect optics, said variable optics including variable spherical optics to vary the spherical component of light projected there through and variable cylindrical optics for varying the cylinder lens power along first intersecting diagonals at substantially equal and opposite angles from the preselected angular alignment of said first straight line target; projecting an image of said straight line target from said light passing through said variable optics and said suspect optics; and projecting from said light path behind said projected image of said straight line target an image of the suspect optics to a screen; and varying said spherical optics and said first cylinder optics to obtain a uniform image of the Focault variety of said suspect optics.

15. A process according to claim 14 wherein said image of said suspect optics is uniformly bright.

16. A process according to claim 14 wherein the image of said suspect optics is uniformly dark.

17. An apparatus for measuring at least one component of cylinder of a suspect optical system comprising: means for projecting an image of at least one straight line target along a light path; means for holding relative to and in said light path a suspect optical system including possible components of optical sphere and optical cylinder without regard to any suspected principal axis of the suspected optical system along said light path; variable optics in said light path for varying the spherical correction and variable astigmatic optics for varying the astigmatic lens power along first intersecting diagonals at substantially equal and opposite angles from the preselected angular alignment of said straight line target, said variable optics movable to an optic power of sphere and astigmatism equal and opposite to the optic power of said suspect optical system; means for imaging light passing through said variable optics and said suspect optics to project an image of said straight line target.

18. The apparatus of claim 17 and including means for projecting an image of at least one second straight line target, said second straight line target being at an angle oblique to said first straight line target; said variable optics including second variable cylindrical optics having cylindrical lens power along second intersecting diagonals at substantially equal and opposite angles from the angular alignment of said second straight line target.

19. The apparatus of claim 17 and wherein said means for projecting an image of light of at least one straight line target along a light path includes means for projecting an image of a first knife edge.

20. The apparatus of claim 19 and wherein means for projecting an image of light of at least one straight line target includes means for projecting the image of said knife edge to retroproject said image to said first knife edge.

21. The apparatus of claim 20 and wherein means for projecting an image of light of at least one straight line target includes means for projecting the image of said knife edge to project said image to a second knife edge having the same alignment of said first knife edge.

22. The apparatus of claim 17 and including means for projecting an image of said suspect optics to a screen from a location on said light path beyond the projected image of said straight line target.

23. An apparatus for measuring at least one component of cylinder of a suspect optical system comprising: means for projecting an image of a first knife edge along a light path; means for holding relative to said light path a suspect optical system including possible components of optical sphere and optical cylinder; variable optics in said light path having an optical effect substantially coincident with said suspect optical system, said variable optics including variable spherical optics for varying the spherical correction and variable cylindrical optics for varying cylinder lens power along first intersecting diagonals at substantially equal and opposite angles from the preselected angular alignment of said straight line target; said variable optics movable to an optic power of sphere and cylinder equal and opposite to the optics power of said suspect optical system; and, means for projecting an image from the light passing through said variable optics and said suspect optics to a knife edge of said same preselected angular alignment.

24. The apparatus of claim 23 and wherein said means for projecting the light passing through said variable optics and said suspect optics projects said light to said first knife edge.

25. The apparatus of claim 23 and wherein said means for projecting the light passing through said variable optics and said suspect optics includes a second knife edge having the same alignment relative to said light path as said first knife edge and means for projecting said image from said
light to said second knife edge.

26. The apparatus of claim 23 and including means for projecting an image of said suspect optics to a screen.

27. The apparatus of claim 26 and wherein said screen is photosensitive and includes means for detecting differential illumination at said screen and means operatively connected to said variable optics from said photosensitive screen to vary the image of said suspect optics to a uniformly illuminated image of said suspect optics.

28. An apparatus for measuring at least one component of cylinder of a suspect optical system comprising: means for projecting an image of a knife edge along a light path including a light source, a knife edge and optics for projecting light from said source past said knife edge into said optics to emit from said optics light containing an image of said knife edge; means for holding relative to said light path a suspect optical system including possible components of optical sphere and optical cylinder; variable optics in said light path having an optical effect substantially coincident with said suspect optical system, said variable optics including variable spherical optics for varying the spherical correction and variable cylindrical optics for varying the cylindrical lens power along first intersecting diagonals at substantially equal and opposite angles from the preselected angular alignment of said straight line target; said variable optics movable to an optic power of sphere and cylinder equal and opposite to the optical power of said suspect optical system; means for projecting light passing through said variable optics and said suspect optics at least once to project an image of said knife edge to a knife edge; an imaging screen; and, means for imaging to a screen beyond said knife edge an image of said suspect optics.

29. The apparatus of claim 28 and including a photosensitive screen having means for detecting differential illumination at said screen and means operatively connected to said variable optics from said photosensitive screen to vary the image of said suspect optics to a uniformly illuminated image of said suspect optics.

30. The apparatus of claim 28 and including means for retroreflecting and displacing light passing through said variable optics and said suspect optics so that said light is passed a second time through variable optics and suspect optics and wherein said means for projecting light passing through said variable optics and said suspect optics includes a beam splitter for reflecting out at least a part of said light emanating from said retroreflecting and displacing means.

31. An apparatus for measuring sphere and cylinder of a suspect optical system comprising: means for projecting an image of a first straight line target along a light path; means for holding relative to said light path a suspect optical system including possible components of optical sphere and optical cylinder; variable optics in said light path having an optical effect substantially coincident with said suspect optical system, said variable optics including variable spherical optics for varying the spherical correction and variable cylindrical optics for varying cylindrical lens power along first intersecting diagonals at substantially equal and opposite angles from the preselected angular alignment of said first straight line target; said variable optics movable to an optic power of sphere and cylinder equal and opposite to the optic power of said suspect optical system; means for projecting light passing through said variable optics and said suspect optics to project an image of said straight line target at a knife edge; means for projecting an image of said suspect optics to a photosensitive surface divided into discrete photosensitive parts over the image of said suspect optical system; said discrete parts including outputs indicating differential illumination of said discrete parts of said photosensor; means for varying said variable optics including said variable spherical optics and said variable cylinder optics remotely responsive to a differential signal; and, means operatively connected between said photosensor segments and said varying means in said variable optics to cause said variable optics to move to create a uniformly illuminated image at said photosensor.

32. The invention of claim 31 wherein said image is a uniformly bright image.

33. A process for measuring the power of a suspect optical system in prism relative to a preselected point in said suspect optical system including the steps of: mounting said suspect optical system in a light path along an axis wherein said point of said suspect optical system is registered to the axis of said light path; projecting light including an image of at least one first straight line target of a first arbitrary preselected angular alignment without regard to any suspect principal axis of the suspect optical system along said light path; providing variable optics in said light path having variable spherical optics for varying the spherical correction and variable cylindrical optics for varying cylindrical lens power along first intersecting diagonals at substantially equal and opposite angles from the preselected angular alignment of said projected first straight line target; providing retroreflecting optics having the property of reflecting and displacing light; projecting said light through said suspect optical system and said variable optics to said retroreflecting optics; projecting a first image of said straight line target from said reflected and displaced light rebounding from said retrodirective optics to focus the image of said projected straight line target at a preselected location; replacing said retrodirecting optics with reflecting means to reflect said light including said image of said first straight line target; projecting a second image of said straight line target from said reflected light from said reflecting means; and, measuring the displacement of said first and second projected images of said straight line target to determine prism in at least one component at an angle to said straight line.

34. A process according to claim 33 and including the step of neutralizing the cylinder and sphere of said optical system.

35. The process according to claim 34 and wherein said cylinder and said sphere is neutralized before prism is determined.

36. The process according to claim 34 and wherein said cylinder and sphere is neutralized after prism is determined.

* * * * *